United States Patent
Saleh et al.

(10) Patent No.: US 10,410,313 B2
(45) Date of Patent: Sep. 10, 2019

(54) DYNAMIC FOVEATION ADJUSTMENT

(71) Applicant: QUALCOMM Incorporated, San Diego, CA (US)

(72) Inventors: Skyler Jonathon Saleh, San Diego, CA (US); Maurice Franklin Ribble, Lancaster, MA (US); David Rigel Garcia Garcia, North York (CA)

(73) Assignee: QUALCOMM Incorporated, San Diego, CA (US)

( * ) Notice: Subject to any disclaimer, the term of this patent is extended or adjusted under 35 U.S.C. 154(b) by 29 days.

(21) Appl. No.: 15/230,073

(22) Filed: Aug. 5, 2016

(65) Prior Publication Data

US 2018/0040097 A1 Feb. 8, 2018

(51) Int. Cl.
| G06T 1/20 | (2006.01) |
| G06T 5/00 | (2006.01) |
| G06T 19/00 | (2011.01) |
| G06F 9/50 | (2006.01) |

(52) U.S. Cl.
CPC .............. *G06T 1/20* (2013.01); *G06F 9/5094* (2013.01); *G06T 5/002* (2013.01); *G06T 19/006* (2013.01); *Y02D 10/22* (2018.01)

(58) Field of Classification Search
CPC . G06F 3/013; G06F 1/163; G02B 2027/0138; G02B 2027/0178; G06T 1/20; G06T 15/005; G06T 15/503; G06T 17/005; G06T 11/001; G09G 5/42; H04N 13/257; H04N 13/383
USPC ......................................................... 345/611
See application file for complete search history.

(56) References Cited

U.S. PATENT DOCUMENTS

| 7,850,306 | B2 | 12/2010 | Uusitalo et al. | |
| 8,913,004 | B1 | 12/2014 | Bozarth et al. | |
| 2014/0247277 | A1* | 9/2014 | Guenter | G06T 11/00 345/611 |
| 2014/0347363 | A1 | 11/2014 | Kaburlasos | |
| 2015/0006925 | A1* | 1/2015 | Branover | G06F 1/3206 713/320 |
| 2015/0042553 | A1 | 2/2015 | Mecham | |
| 2015/0181117 | A1* | 6/2015 | Park | H04N 5/23216 348/372 |
| 2016/0358537 | A1* | 12/2016 | Kang | G06T 1/20 |
| 2017/0124760 | A1* | 5/2017 | Murakawa | G06T 17/20 |

OTHER PUBLICATIONS

Alex V., "Advanced VR Rendering Performance", Game Developers Conference '16, Mar. 14, 2016 (Mar. 14, 2016), pp. 1-52, XP055398816, Retrieved from the Internet: URL:http://alex.vlachos.comjgraphics/Alex_Vlachos_Advanced_VR_Rendering_Performance_GDC2016:pdf [retrieved on Aug. 15, 2017].
International Search Report and Written Opinion—PCT/US2017/033658—ISA/EPO—dated Aug. 29, 2017 14 pages.
(Continued)

*Primary Examiner* — Wesner Sajous
(74) *Attorney, Agent, or Firm* — Shumaker & Sieffert, P.A.

(57) ABSTRACT

This disclosure describes examples for determining an amount of foveation that is to be applied for rendering an image. The example techniques may use information indicative of a performance of a graphics processing unit (GPU) to determine the amount of foveation that is to be applied. The GPU may render an image based on the determined amount of foveation.

19 Claims, 4 Drawing Sheets

(56) References Cited

OTHER PUBLICATIONS

Response to Written Opinion from corresponding PCT Application Serial No. PCT/US2017/033658 filed on Nov. 14, 2017 (6 pages).
International Preliminary Report on Patentability—PCT/US2017/033658, The International Bureau of WIPO—Geneva, Switzerland, dated Oct. 15, 2018 (7 pp).
Second Written Opinion from corresponding PCT Application Serial No. PCT/US2017/033658 dated Jul. 5, 2018 (6 pp).

\* cited by examiner

DYNAMIC FOVEATION ADJUSTMENT

TECHNICAL FIELD

This disclosure relates to graphics processing.

BACKGROUND

Computing devices often utilize a graphics processing unit (GPU) to accelerate the rendering of graphics data for display. Such computing devices may include, e.g., computer workstations, mobile phones such as so-called smartphones, embedded systems, personal computers, tablet computers, and video game consoles. GPUs typically execute a graphics processing pipeline that includes a plurality of processing stages which operate together to execute graphics processing commands. A host central processing unit (CPU) may control the operation of the GPU by issuing one or more graphics processing commands to the GPU. Modern day CPUs are typically capable of concurrently executing multiple applications, each of which may need to utilize the GPU during execution.

SUMMARY

This disclosure is directed to dynamically control the amount of foveation applied by a graphics processing unit (GPU) during rendering. The amount of foveation that a GPU applies has an effect on the amount of power the GPU consumes. In some examples, the GPU outputs performance measurements that a central processing unit (CPU) or the GPU itself uses to control the amount of foveation that is applied. This disclosure describes using the performance measurement as a feedback to adjust the foveation that is applied to maintain the performance of the GPU within a particular range.

In one example, the disclosure describes a method of processing data, the method comprising receiving information indicative of a performance of a graphics processing unit (GPU), determining an amount of foveation to apply based on the received information, and outputting information of the determined amount of foveation to apply to the GPU for the GPU to render an image based on the determined amount of foveation to apply.

In one example, the disclosure describes a device for processing data, the device comprising a graphics processing unit (GPU), a performance estimation circuit configured to receive information indicative of a performance of the GPU, and a foveation gate circuit configured to determine an amount of foveation to apply based on the received information, and output information of the determined amount of foveation to apply to the GPU for the GPU to render an image based on the determined amount of foveation to apply.

In one example, the disclosure describes a device for processing data, the device comprising means for receiving information indicative of a performance of a graphics processing unit (GPU), means for determining an amount of foveation to apply based on the received information, and means for outputting information of the determined amount of foveation to apply to the GPU for the GPU to render an image based on the determined amount of foveation to apply.

In one example, the disclosure describes a computer-readable storage medium having instructions stored thereon that when executed cause one or more processors of a device for processing data to receive information indicative of a performance of a graphics processing unit (GPU), determine an amount of foveation to apply based on the received information, and output information of the determined amount of foveation to apply to the GPU for the GPU to render an image based on the determined amount of foveation to apply.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
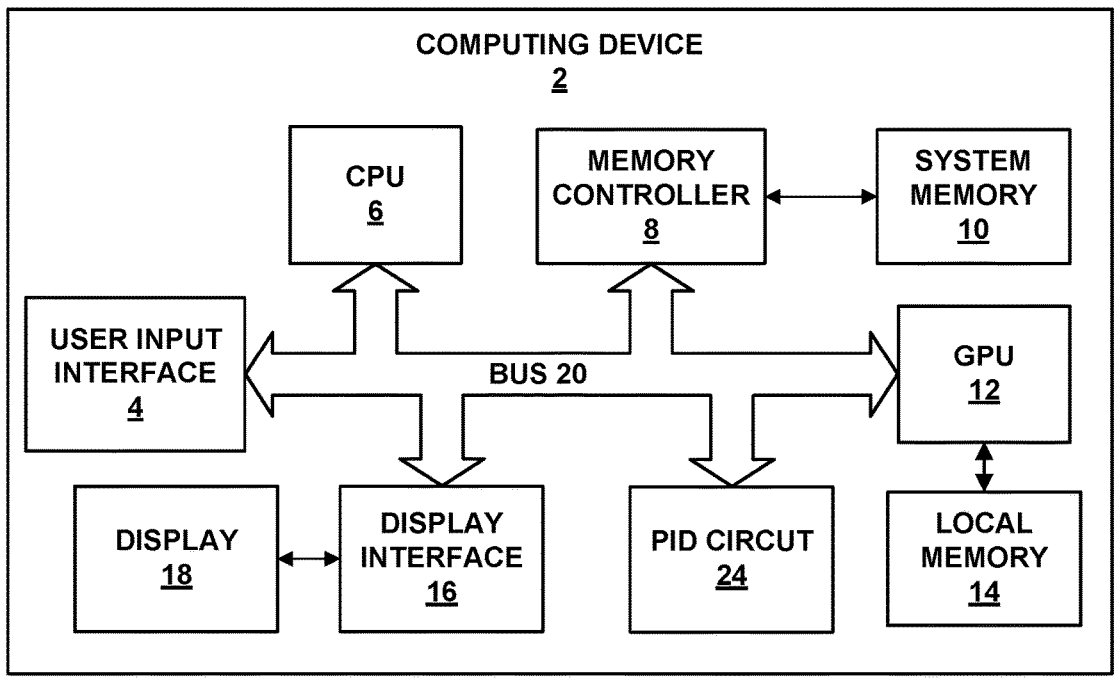
FIG. 1 is a block diagram illustrating an example computing device that may be used to implement the techniques of this disclosure.

Graphics processing units (GPUs) are designed with ways to scale back power consumption to fit the thermal demands of the system. One way to scale back power is thermal throttling where the GPU reduces the clock rate and processes graphics data more slowly. However, reduction in clock rate reduces the frame rate and possibly causes frame jitter (e.g., micro-stutters in the content). In a virtual reality (VR) setting, lower frame rate and frame jitter may cause motion sickness and other unwanted effects that negatively impact viewer experience.

In addition to or instead of using clock frequency and voltage control, the techniques described in this disclosure include gating foveation applied to an image to control GPU power dissipation. Foveation is a way to blur portions of the image that the viewer is not viewing. In some cases, the GPU applies foveation to guide the viewer to a particular portion of the image by blurring other portions of the image. In other cases, by tracking eye movement and determining the location within the image where the viewer is viewing, the GPU may apply foveation to blur the other portions of the image.

Foveation may reduce the amount of power the GPU expends in rendering an image. For instance, one way to cause blurring is to reduce the resolution in some portions relative to other portions. In the reduced resolution portion, the size of each fragment being processed is relatively larger, meaning that there are fewer fragments in the lower resolution portion than in the higher resolution portion. Because there are fewer fragments, the number of instances that a fragment shader is executed is reduced, resulting in lower power consumption.

In example techniques described in this disclosure, an application executing on a host processor generates rendering commands that a GPU is to execute, and information indicative of a foveation quality (e.g., by how much to blur and how large of an area to blur). A graphics driver executing on the host processor may be configured to transmit information indicative of the foveation quality to the GPU for graphics processing.

However, in the techniques described in this disclosure, the graphics driver may modify the foveation quality information to reduce the amount of power the GPU needs to expend. For example, a foveation controller (e.g., hardware or software unit) receives information from performance measuring units such as counters that indicate how busy the GPU is in processing data, the temperature of the system, real power measurements, and other such information. From the performance information, the foveation controller determines an estimate of the power usage and compares the estimate of the power usage to a desired power usage. The foveation controller then instructs the graphics driver to increase the amount of blurring the GPU is to apply to reduce power or decrease the amount of blurring the GPU is to apply or make no change if there is sufficient power budget.

There may be various ways in which to apply blurring. For example, one way to apply blurring is to upsample regions from a lower sampling resolution to fill corresponding regions of the screen. In this case, the upsampled image will look more clear relative to the other portions, which will appear blurred. In other words, the result of doing this upsampling on the final image looks very similar to applying a blur around the periphery of the image.

FIG. 1 is a block diagram illustrating an example computing device 2 that may be used to implement techniques of this disclosure. Computing device 2 may comprise a personal computer, a desktop computer, a laptop computer, a computer workstation, a video game platform or console, a wireless communication device (such as, e.g., a mobile telephone, a cellular telephone, a satellite telephone, and/or a mobile telephone handset), a landline telephone, an Internet telephone, a handheld device such as a portable video game device or a personal digital assistant (PDA), a personal music player, a video player, a display device, a television, a television set-top box, a server, an intermediate network device, a mainframe computer or any other type of device that processes and/or displays graphical data.

As illustrated in the example of FIG. 1, computing device 2 includes a user input interface 4, a CPU 6, a memory controller 8, a system memory 10, a graphics processing unit (GPU) 12, a local memory 14 of GPU 12, a display interface 16, a display 18 and bus 20. User input interface 4, CPU 6, memory controller 8, GPU 12 and display interface 16 may communicate with each other using bus 20. Bus 20 may be any of a variety of bus structures, such as a third generation bus (e.g., a HyperTransport bus or an InfiniBand bus), a second generation bus (e.g., an Advanced Graphics Port bus, a Peripheral Component Interconnect (PCI) Express bus, or an Advanced eXentisible Interface (AXI) bus) or another type of bus or device interconnect. It should be noted that the specific configuration of buses and communication interfaces between the different components shown in FIG. 1 is merely exemplary, and other configurations of computing devices and/or other graphics processing systems with the same or different components may be used to implement the techniques of this disclosure.

CPU 6 may comprise a general-purpose or a special-purpose processor that controls operation of computing device 2. A user may provide input to computing device 2 to cause CPU 6 to execute one or more software applications. The software applications that execute on CPU 6 may include, for example, an operating system, a word processor application, an email application, a spread sheet application, a media player application, a video game application, a graphical user interface application or another program. The user may provide input to computing device 2 via one or more input devices (not shown) such as a keyboard, a mouse, a microphone, a touch pad or another input device that is coupled to computing device 2 via user input interface 4.

The software applications that execute on CPU 6 may include one or more graphics rendering instructions that instruct CPU 6 to cause the rendering of graphics data to display 18. In some examples, the software instructions may conform to a graphics application programming interface (API), such as, e.g., an Open Graphics Library (OpenGL®) API, an Open Graphics Library Embedded Systems (OpenGL ES) API, a Direct3D API, an X3D API, a RenderMan API, a WebGL API, or any other public or proprietary standard graphics API. In order to process the graphics rendering instructions, CPU 6 may issue one or more graphics rendering commands to GPU 12 to cause GPU 12 to perform some or all of the rendering of the graphics data. In some examples, the graphics data to be rendered may include a list of graphics primitives, e.g., points, lines, triangles, quadralaterals, triangle strips, etc.

Memory controller 8 facilitates the transfer of data going into and out of system memory 10. For example, memory controller 8 may receive memory read and write commands, and service such commands with respect to memory 10 in order to provide memory services for the components in computing device 2. Memory controller 8 is communicatively coupled to system memory 10. Although memory controller 8 is illustrated in the example computing device 2 of FIG. 1 as being a processing module that is separate from both CPU 6 and system memory 10, in other examples, some or all of the functionality of memory controller 8 may be implemented on one or both of CPU 6 and system memory 10.

System memory 10 may store program modules and/or instructions that are accessible for execution by CPU 6 and/or data for use by the programs executing on CPU 6. For example, system memory 10 may store user applications and graphics data associated with the applications. System memory 10 may additionally store information for use by and/or generated by other components of computing device 2. For example, system memory 10 may act as a device memory for GPU 12 and may store data to be operated on by GPU 12 as well as data resulting from operations performed by GPU 12. For example, system memory 10 may store any combination of texture buffers, depth buffers, stencil buffers, vertex buffers, frame buffers, or the like. In addition, system memory 10 may store command streams for processing by GPU 12. System memory 10 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), flash memory, a magnetic data media or an optical storage media.

GPU 12 may be configured to perform graphics operations to render one or more graphics primitives to display 18. Thus, when one of the software applications executing on CPU 6 requires graphics processing, CPU 6 may provide graphics commands and graphics data to GPU 12 for rendering to display 18. The graphics commands may include, e.g., drawing commands such as a draw call, GPU state programming commands, memory transfer commands, general-purpose computing commands, kernel execution commands, etc. In some examples, CPU 6 may provide the commands and graphics data to GPU 12 by writing the commands and graphics data to memory 10, which may be accessed by GPU 12. In some examples, GPU 12 may be further configured to perform general-purpose computing for applications executing on CPU 6.

GPU 12 may, in some instances, be built with a highly-parallel structure that provides more efficient processing of vector operations than CPU 6. For example, GPU 12 may include a plurality of processing elements that are configured to operate on multiple vertices or pixels in a parallel manner. The highly parallel nature of GPU 12 may, in some instances, allow GPU 12 to draw graphics images (e.g., GUIs and two-dimensional (2D) and/or three-dimensional (3D) graphics scenes) onto display 18 more quickly than drawing the scenes directly to display 18 using CPU 6. In addition, the highly parallel nature of GPU 12 may allow GPU 12 to process certain types of vector and matrix operations for general-purpose computing applications more quickly than CPU 6.

GPU 12 may, in some instances, be integrated into a motherboard of computing device 2. In other instances, GPU 12 may be present on a graphics card that is installed in a port in the motherboard of computing device 2 or may be otherwise incorporated within a peripheral device configured to interoperate with computing device 2. In further instances, GPU 12 may be located on the same microchip as CPU 6, forming a system on a chip (SoC). GPU 12 may include one or more processors, such as one or more microprocessors, application specific integrated circuits (ASICs), field programmable gate arrays (FPGAs), digital signal processors (DSPs), or other equivalent integrated circuits or discrete logic circuits.

GPU 12 may be directly coupled to GPU local memory 14. Thus, GPU 12 may read data from and write data to GPU local memory 14 without necessarily using bus 20. In other words, GPU 12 may process data locally using a local storage, instead of off-chip memory. This allows GPU 12 to operate in a more efficient manner by eliminating the need of GPU 12 to read and write data via bus 20, which may experience heavy bus traffic. In some instances, however, GPU 12 may not include a separate cache, but instead utilize system memory 10 via bus 20. GPU local memory 14 may include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), flash memory, a magnetic data media or an optical storage media.

CPU 6 and/or GPU 12 may store rendered image data in a frame buffer that is allocated within system memory 10. Display interface 16 may retrieve the data from the frame buffer and configure display 18 to display the image represented by the rendered image data. In some examples, display interface 16 may include a digital-to-analog converter (DAC) that is configured to convert the digital values retrieved from the frame buffer into an analog signal consumable by display 18. In other examples, display interface 16 may pass the digital values directly to display 18 for processing. Display 18 may include a monitor, a television, a projection device, a liquid crystal display (LCD), a plasma display panel, a light emitting diode (LED) array, a cathode ray tube (CRT) display, electronic paper, a surface-conduction electron-emitted display (SED), a laser television display, a nanocrystal display or another type of display unit. Display 18 may be integrated within computing device 2. For instance, display 18 may be a screen of a mobile telephone handset or a tablet computer. Alternatively, display 18 may be a stand-alone device coupled to computing device 2 via a wired or wireless communications link. For instance, display 18 may be a computer monitor or flat panel display connected to a personal computer via a cable or wireless link.

In some examples, GPU 12 may generate graphics data for virtual reality (VR) applications. For example, CPU 6 executes an application that commands and data for VR content and GPU 12 receives the commands and data and generates the graphics VR content for display. A user of device 2 may connect device 2 to headgear that the user wears. Display 18 faces the user's eyes. VR content is particularly popular for gaming applications, but the techniques described in this disclosure are not limited to VR applications or gaming applications.

The generation of graphical content causes GPU 12 to consume power and causes GPU 12 to heat, which causes the integrated circuit that includes GPU 12 to heat. For applications requiring extensive processing, such as VR applications as one non-limiting example, GPU 12 may overheat relative to desired levels of heat. To avoid GPU 12 from overheating and thereby causing the integrated circuit housing GPU 12 to overheat, various techniques may be used such as thermal throttling.

In thermal throttling, GPU 12 may reduce its frame rate. For instance, for high quality user experience, GPU 12 may generate approximately 60 to 120 image frames per second, where each image frame includes a snapshot of image content of the application. With a frame rate of 60 to 120 fps (frames per second), the user may perceive seamless motion of objects in the application and may feel immersed in the VR world.

Generating graphical content at 60 to 120 fps constantly, as might be needed with VR applications, can potentially cause GPU 12 to overheat and/or consume more power than average, reducing operational length of device 2. With thermal throttling, rather than generating graphical content at 60 to 120 fps, GPU 12 may generate graphical content at 15 to 30 fps, thereby reducing the amount of graphical content that needs to be generated, resulting in reduced power consumption and cooling of GPU 12.

However, lowering the frame rate or oscillating between a lower frame rate and a higher frame rate may potentially cause frame jitter, where moving graphical content does not appear to move smoothly. For VR applications, thermal throttling for lowering frame rate or oscillating between lower and higher frame rates can cause motion sickness and can negatively impact the immersion experience.

One way to reduce power consumption and thereby avoid overheating is through foveated rendering. In foveated rendering, GPU 12 renders certain portions of the image frame at high resolution and other portions of the image frame at lower resolution, as compared to normal rendering where all portions of the image frame are rendered at the same resolution.

In general, for foveated rendering, GPU 12 may render less fragments (e.g., image pixels) in areas that the user will not notice. For instance, from eye tracking or based on information from the executing application, GPU 12 may render portions where the user is actually looking or portions where the user should be looking with higher resolution relative to the other portions.

Rendering graphics content at higher resolution tends to result in higher power consumption and heating of GPU 12 relative to rendering graphics content at lower resolution. However, rendering graphics content only at relatively low resolution results in poor user experience. Accordingly, by having image frame areas with different resolutions, viewer experience can be kept high because the areas with high resolution are areas where the viewer is or should be viewing, and areas where the viewer is not viewing or should not be viewing are at low resolution, thereby conserving power.

As an example, if GPU 12 were to render VR content, with the entire image frame being rendered at the same baseline resolution, GPU 12 would consume approximately 1100 mW. With foveation rendering, GPU 12 may consume approximately 300 mW, representing approximately a 70% reduction in power.

In addition to power saving, GPU 12 may be able to improve fill rate because there are fewer pixels to render. Faster fill rate allows for achieving the desired frame rate, but without GPU 12 heating to greater than a desired level (e.g., enabling high quality VR rendering in a mobile thermal envelope).

For foveation rendering, the application executing on CPU 6 defines the foveation gain (e.g., where and how much foveation is applied). The foveation gain defines the amount of foveation GPU 12 is to apply (more foveation means blurry content, and less foveation means sharper image content).

However, the foveation gain and the portions are statically defined by the application. The application executing on CPU 6 may not be configured to determine the performance of GPU 12, and therefore may not be able to actively determine that the performance of GPU 12 is such that the foveation gain or portion should be changed. The application may not be able to accurately determine the foveation gain because the foveation gain is both content dependent and dependent on the ambient conditions of the environment in which device 2 is operating. The application may be able to set the foveation gain based on the content, but may not have information about the ambient condition to set the foveation gain.

In examples described in this disclosure, processing circuitry (e.g., CPU 6, GPU 12, or circuitry external to CPU 6 and GPU 12) may be configured to determine how much foveation GPU 12 is to actually apply to ensure that GPU 12 is operating at the correct performance level. Although the above is described with respect to ensuring that the temperature of GPU 12 or the integrated circuit that includes GPU 12 does not overheat, the examples are not so limited, and may be extended more generally to keep the performance of GPU 12 at a desired level. For instance, examples of the performance of GPU 12 include temperature of GPU 12 or integrated circuit housing GPU 12, power consumption of GPU 12, bandwidth usage of GPU 12 (e.g., access to memory 10), GPU core utilization, GPU core selection and graphics API usage (e.g., whether adjusting how much foveation is applied will effect power consumption). The processing circuitry may utilize one or more of these factors to determine one or more performance values of GPU 12. In some examples, the processing circuitry may weigh these factors differently to determine the one or more performance values.

In examples described in this disclosure, the processing circuitry may determine the amount of foveation to apply (e.g., how much foveation to apply and where to apply the foveation) based on the performance value(s). For example, the performance values may be fed back to a performance estimation circuit that compares the performance value(s) to a performance threshold value. If the performance value(s) are greater than the performance threshold value, the performance estimation circuit may output information indicating whether performance values(s) are greater than the performance threshold value (e.g., in form of a control signal) to a foveation gate circuit to cause the foveation gate circuit to increase the foveation gain (e.g., increase the amount of foveation that is applied) from the foveation gain that the application executing on CPU 6 determined. If the performance value(s) are less than or equal to the performance threshold value, the performance estimation circuit may not output any information to the foveation gate circuit or output a control signal to the foveation gate circuit so that the foveation gate circuit makes no change to the foveation gain determined by the application or may output a control signal or information to foveation gate circuit to decrease the foveation gain.

In this way, the performance estimation circuit and foveation gate circuit together form a proportional-integral-derivative (PID) circuit 24 that dynamically (e.g., during runtime) determines the foveation that GPU 12 is to apply based on various performance factors such as ambient conditions (e.g., temperature) and usage of GPU 12. The performance threshold value may be equal to or less than the desired maximum performance level of GPU 12 (e.g., one or more or combination of power, temperature, GPU core usage, bandwidth usage, etc.). The PID circuit may continuously monitor performance of GPU 12 and amplify or not amplify the foveation gain based on the monitored performance.

In some examples, the application executing on CPU 6 may not be configured to define a foveation gain. In such examples, the PID circuit may determine a foveation gain value rather than an adjustment to the foveation gain value. Accordingly, in this disclosure, determining the amount of foveation to apply refers to determining how much foveation to apply and where to apply the foveation in a frame to be rendered or determining how much to adjust the foveation determined by the application and adjustment to where the foveation is to be applied in the frame to be rendered.

Figure 2:
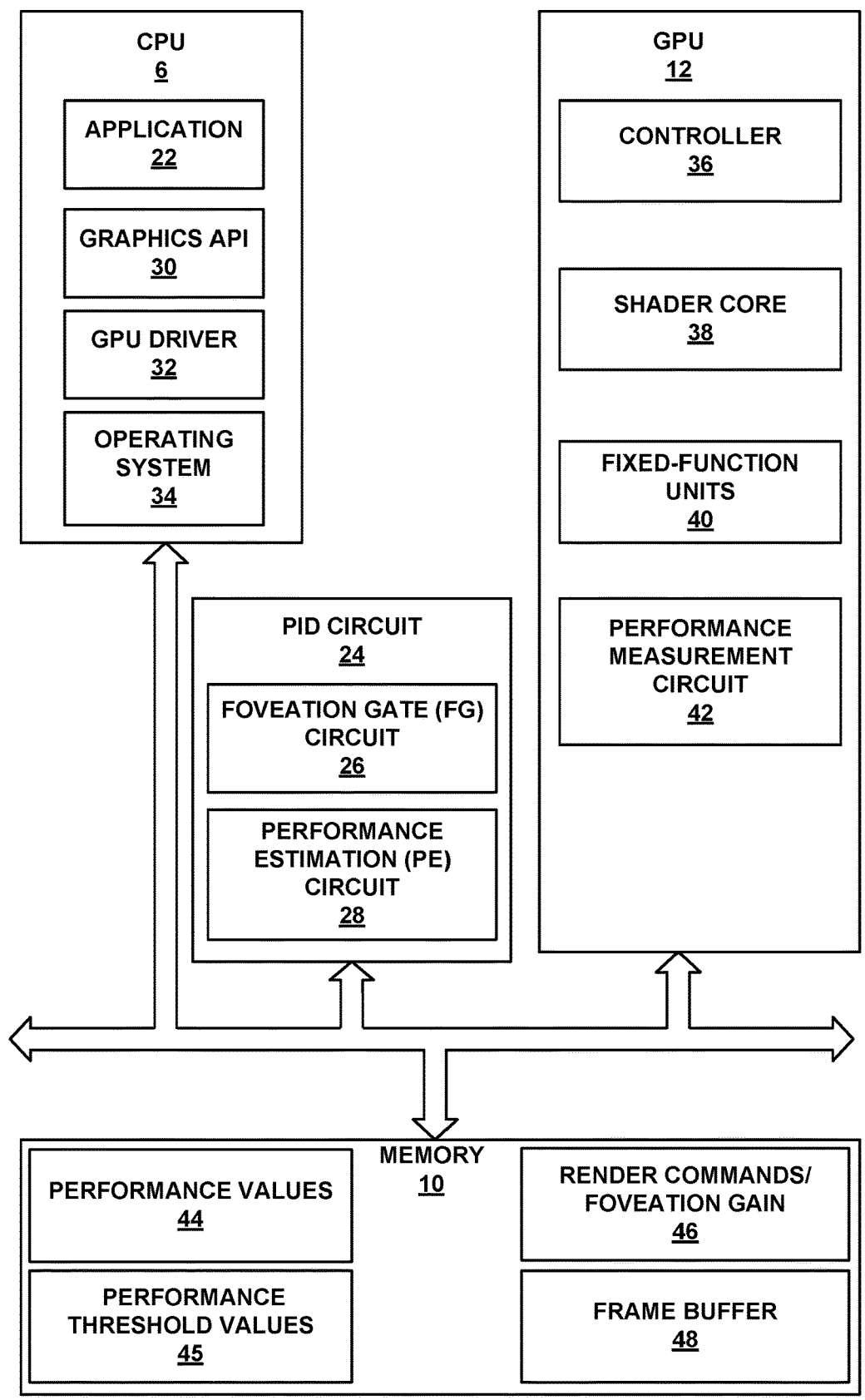
FIG. 2 is a block diagram illustrating a CPU, a GPU and a memory of the computing device of FIG. 1 in further detail.

FIG. 2 is a block diagram illustrating CPU 6, GPU 12 and memory 10 of computing device 2 of FIG. 1 in further detail. As shown in FIG. 2, CPU 6 is communicatively coupled to GPU 12 and memory 10, and GPU 12 is communicatively coupled to CPU 6 and memory 10. GPU 12 may, in some examples, be integrated onto a motherboard with CPU 6. In additional examples, GPU 12 may be implemented on a graphics card that is installed in a port of a motherboard that includes CPU 6. In further examples, GPU 12 may be incorporated within a peripheral device that is configured to interoperate with CPU 6. In additional examples, GPU 12 may be located on the same microchip as CPU 6 forming a system on a chip (SoC). CPU 6 is configured to execute application 22, a graphics API 30, a GPU driver 32, and an operating system 34.

As also illustrated, proportional-integral-derivative (PID) circuit 24 includes foveation gate (FG) circuit 26 and performance estimation (PE) circuit 28. PID circuit 24 may be implemented as fixed-function hardware circuitry, programmable circuitry, or a combination. For ease of understanding only, PID circuit 24 is described as fixed-function hardware circuitry.

In examples where PID circuit 24 is formed as its own fixed-function hardware circuitry, PID circuit 24 may be standalone circuitry coupled to CPU 6, GPU 12, and memory 10 via bus 20. However, in some examples, PID circuit 24 may be specially formed as fixed-function circuitry in CPU 6 or possibly GPU 12. In some examples, CPU 6, GPU 12, and PID circuit 24 may be formed in a common microchip or as a common integrated circuit, and in such examples, CPU 6, GPU 12, and PID circuit 24 may communicate with one another via an integrate bus.

In examples where PID circuit 24 is programmable circuitry, PID circuit 24 may be formed as part of CPU 6 or GPU 12, as two non-limiting examples. In examples where PID circuit 24 is programmable circuitry, memory 10 may store commands that execute on PID circuit 24 and cause PID circuit to perform the examples described in this disclosure. The commands that PID circuit 24 executes may be in form of an application that a compiler of CPU 6 compiles or may be direct object store or firmware stored in memory 10. For ease of description and illustration, PID circuit 24 is illustrated as fixed-function circuit external to CPU 6 and GPU 12.

PID circuit 24 may be configured to determine the amount of foveation that GPU 12 is to apply in rendering an image frame. For example, PID circuit 24 may determine the amount of foveation that GPU 12 is to apply and output information of the determined amount of foveation to apply for GPU 12 to render an image frame based on the determined amount of foveation to apply. PID circuit 24 may output information of the determined amount of foveation to apply to GPU driver 32, and GPU driver 32 causes GPU 12 to apply the determined amount of foveation to render an image frame. PID circuit 24 is one example of processing circuitry configured to determine foveation gain in accordance with the example techniques described in this disclosure.

GPU 12 includes a controller 36, shader core 38, one or more fixed-function units 40, and performance measurement circuit 42. Although illustrated as separate components, in some examples, performance measurement circuit 42 may be part of controller 36. In examples described in this disclosure, performance measurement circuit 42 may determine various performance factors of GPU 12 or the SOC that houses GPU 12 such as temperature, power consumption, shader core 38 and/or fixed-function units 40 usage, and the like. PID circuit 24 may use this information to determine the amount of foveation that GPU 12 is to apply to an image frame.

Software application 22 may include at least some of one or more instructions that cause graphic content to be displayed or one or more instructions that cause a non-graphics task (e.g., a general-purpose computing task) to be performed on GPU 12. Software application 22 may issue instructions to graphics API 30. Graphics API 30 may be a runtime service that translates the instructions received from software application 22 into a format that is consumable by GPU driver 32. In some examples, graphics API 30 and GPU driver 32 may be part of the same software service.

GPU driver 32 receives the instructions from software application 22, via graphics API 30, and controls the operation of GPU 12 to service the instructions. For example, GPU driver 32 may formulate one or more command streams, place the command streams into memory 10, and instruct GPU 12 to execute command streams. GPU driver 32 may place the command streams into memory 10 and communicate with GPU 12 via operating system 34 (e.g., via one or more system calls).

Controller 36 is configured to retrieve the commands stored in the command streams, and dispatch the commands for execution on shader core 38 and one or more fixed-function units 40. Controller 36 may dispatch commands from a command stream for execution on one or more fixed-function units 40 or a subset of shader core 38 and one or more fixed-function units 40. Controller 36 may be hardware of GPU 12, may be software or firmware executing on GPU 12, or a combination of both.

Shader core 38 includes programmable circuitry (e.g., processing cores on which software executes). One or more fixed-function units 40 include fixed function circuitry configured to perform limited operations with minimal functional flexibility. Shader core 38 and one or more fixed-function units 40 together form a graphics pipeline configured to perform graphics processing.

Shader core 38 may be configured to execute one or more shader programs that are downloaded onto GPU 12 from CPU 6. A shader program, in some examples, may be a compiled version of a program written in a high-level shading language (e.g., an OpenGL Shading Language (GLSL), a High Level Shading Language (HLSL), a C for Graphics (Cg) shading language, etc). In some examples, shader core 38 may include a plurality of processing units that are configured to operate in parallel (e.g., a SIMD pipeline). Shader core 38 may have a program memory that stores shader program instructions and an execution state register (e.g., a program counter register) that indicates the current instruction in the program memory being executed or the next instruction to be fetched. Examples of shader programs that execute on shader core 38 include, for example, vertex shaders, pixel shaders (also referred to as fragment shaders), geometry shaders, hull shaders, domain shaders, compute shaders, and/or unified shaders.

Fixed-function units 40 may include hardware that is hard-wired to perform certain functions. Although the fixed function hardware may be configurable, via one or more control signals, for example, to perform different functions, the fixed function hardware typically does not include a program memory that is capable of receiving user-compiled programs. In some examples, one or more fixed-function units 40 may include, for example, processing units that perform raster operations (e.g., depth testing, scissors testing, alpha blending, etc).

GPU driver 32 of CPU 6 may be configured to write the command streams to memory 10, and controller 36 of GPU 12 may be configured to read the one or more commands of command streams from memory 10. In some examples, one or both of command streams may be stored as a ring buffer in memory 10. A ring buffer may be a buffer with a circular addressing scheme where CPU 6 and GPU 12 maintain synchronized state variables associated with the writing of data to and reading of data from the ring buffer. For example, if the first command stream is a ring buffer, each of CPU 6 and GPU 12 may store a write pointer indicating the next address to be written to in the ring buffer, and a read pointer indicating the next address to be read from in the ring buffer.

When CPU 6 writes a new command to the ring buffer, CPU 6 may update the write pointer in CPU 6 and instruct GPU 12 to update the write pointer in GPU 12. Similarly, when GPU 12 reads a new command from the ring buffer, GPU 12 may update the read pointer in GPU 12 and instruct CPU 6 to update the read pointer in CPU 6. Other synchronization mechanisms are possible. When the read and/or write pointers reach a highest address in the range of addresses allocated for the ring buffer, the read and/or write pointers may wrap around to the lowest address to implement a circular addressing scheme.

Example operation of an example GPU driver 32 and an example GPU controller 36 is now be described with respect to FIG. 2. GPU driver 32 receives one or more instructions from software application 22 that specify graphics operations and/or general-purpose computing operations to be performed by GPU 12. GPU driver 32 places the output command stream into memory 10, which is accessible by GPU controller 36. GPU driver 32 notifies GPU controller 36 that the command stream corresponding to software application 22 is available for processing. For example, GPU driver 32 may write to a GPU register (e.g., a GPU hardware register polled by GPU 12 and/or a GPU memory-mapped register polled by GPU 12) one or more values indicating that the command stream is ready for execution.

Upon notification that the command stream is ready for execution, controller 36 of GPU 12 may determine if resources are currently available on GPU 12 to begin executing the command stream. If resources are available, controller 36 begins to dispatch the commands in the command stream.

As part of graphics processing, CPU 6 may offload certain graphics processing tasks to GPU 12. For instance, application 22 may generate attribute data for attributes of a plurality of vertices of primitives that interconnect to form a graphical object. Application 22 may store the attribute data in a vertex buffer in memory 10. Graphics driver 32 may instruct controller 36 to retrieve the attribute data for the attributes of the vertices for processing to generate graphics data for display.

In examples described in this disclosure, application 22 generates foveation information that GPU driver 32 is to transmit to GPU 12. The foveation information defines an amount of foveation that GPU 12 is to apply (e.g., how much foveation and areas where the foveation is to applied). Again, foveation defines how blurry areas are to appear.

As an example, application 22 may define foveation information for each of the vertices as part of the attribute data stored in the vertex buffer. In this example, for vertices of primitives that are located in portions where the user is to be viewing, application 22 may define those areas as having low to no foveation, and other portions where the user should not be viewing as having higher foveation. There may be different foveation levels for different areas (e.g., a first portion has no foveation, a second portion has medium foveation, and a third portion has high foveation). In this way, application 22 may define an amount of foveation.

In the techniques described in this disclosure, rather than GPU driver 32 outputting the amount of foveation to be applied to GPU 12, PID circuit 24 may intercept the information indicating the amount of foveation that is to be applied, and may adjust the amount of foveation that is actually applied. For example, PID circuit 24 may update the amount of foveation that is actually applied based on information generated by performance measurement circuit 42.

As an example for illustration purposes only, PID circuit 24 may receive information from GPU driver 32 or possibly even application 22 indicating the amount of foveation that is to be applied. PID circuit 24 may update the amount of foveation that is actually applied based on information generated by performance measurement circuit 42, and output information of the determined amount of foveation to apply to GPU driver 32. GPU driver 32 then outputs the information of the determined amount of foveation to apply to GPU 12 for GPU 12 to render an image frame based on the determined amount of foveation to apply.

As another example for illustration purposes only, PID circuit may receive information from GPU driver 32 or possibly even application 22 indicating the amount of foveation that is to be applied. PID circuit 24 may update the amount of foveation that is actually applied based on information generated by performance measurement circuit 42. In this example, PID circuit 24 may output to GPU 12, without using GPU driver 32, information of the determined amount of foveation to apply.

Performance measurement circuit 42 may be configured to determine various example performance metrics of GPU 12 or the SoC and store the resulting metric values as one or more performance values 44 in memory 10. One example performance metric (or factor) that performance measurement circuit 42 may determine is the power of GPU 12. Performance measurement circuit 42 may continuously or periodically measure the voltage and current being consumed by GPU 12 and multiply the two numbers together to determine the power consumption of GPU 12. Performance measurement circuit 42 may store the power consumption value as one of performance values 44.

Another example performance metric or factor that performance measurement circuit 42 may determine is the bandwidth usage of GPU 12. Each time controller 36 receives data from or outputs data to memory 10 via bus 20, controller 36 may output information to performance measurement circuit 42 indicating how much data GPU 12 transmitted to or received from memory 10. Performance measurement circuit 42 may divide the amount of data transmitted or received over a certain period of time to determine the bandwidth usage of GPU 12. Performance measurement circuit 42 may store the bandwidth usage value as one of performance values 44.

Another example performance metric or factor that performance measurement circuit 42 may determine is GPU core usage. Every clock cycle that shader core 38 or fixed-function units 40 perform an operation, shader core 38 or fixed-function units 40 may output a digital high indicating that they performed an operation. Performance measurement circuit 42 may include an OR gate that receives these signals from shader core 38 or fixed-function units 40 indicating whether an operation was performed during a clock cycle. If at least one of shader core 38 or fixed-function units 40 performed an operation, then the output of the OR gate is a digital one, and if none of shader core 38 or fixed-function units 40 performed an operation, then the output of the OR gate is a digital zero. Performance measurement circuit 42 may determine the number of times the output of the OR gate was a digital one over a certain number of clock cycles as indicative of the GPU core usage. Performance measurement circuit 42 may store the resulting GPU core usage value as one of performance values 44.

In some examples, although not shown, GPU 12 or the SoC may include a temperature sensor, such as a thermistor whose resistance changes as a function of the temperature. Performance measurement circuit 42 may determine the resistance of the thermistor and compare the resistance with a table mapping resistance values to temperature values. Performance measurement circuit 42 may store the temperature value as one of performance values 44.

In some examples, controller 36 may indicate to performance measurement circuit 42 the graphics API that was used, and performance measurement circuit 42 may determine a performance value based on the graphics API. Performance measurement circuit 42 may store the performance value determined from the graphics API usage as one of performance values 44.

Performance measurement circuit 42 may utilize API usage information to determine whether adjusting foveation gain affects power consumption. For instance, CPU 6 may access GPU 12 utilizing various APIs. As one example, graphics API 30 may provide instructions to GPU 12 that conform to the OpenGL API for some operations, and provide instructions to GPU 12 that conform to the OpenCL API for some other instructions (e.g., non-graphics related processing). GPU 12 operating on OpenCL API instructions may not result in any graphics processing, but may result in increases in power consumption. In such cases, if GPU 12 is operating predominately by using the OpenCL API, adjusting foveation gain may not actually change the power consumption a measureable amount.

For example, GPU 12 may be tasked with various operations including some that are not directly related to rendering graphics data. In such cases, the temperature and power consumption of GPU 12 may increase, but any adjustment to the foveation gain may not cause a reduction in power consumption because the cause of the increase in power consumption is unrelated to graphics rendering.

Performance measurement circuit 42 may track how much processing GPU 12 is performing in executing instructions related to graphics processing and in executing instructions related to non-graphics processing. Performance measurement circuit 42 may provide this information to PE circuit 28. PE circuit 28 may utilize the information to determine whether or not to adjust the foveation gain.

As an example, assume a user is playing an augmented reality video game. The rendering may be simple; however, the camera may be running constantly. In this case, CPU 6 may use GPU compute (e.g., non-graphics related instructions) through a non-graphics related API (e.g., OpenCL). Since most of the power draw is from GPU computation, which is not affected by OpenCL, there may be no change to the foveation gain because any adjustment of the foveation gain may not change power consumption.

If PE circuit 28 determines that temperature and power consumption increased, but determines that GPU 12 was predominately executing non-graphics related instructions, PE circuit 28 may determine that there should be no change to the foveation gain because adjusting foveation gain may not reduce power consumption. In this way, PE circuit 28 may use the API usage information as a factor by itself for determining whether to adjust the foveation, or may use the API usage information in conjunction with other factors to determine whether to adjust foveation.

PE circuit 28 of PID circuit 24 may retrieve one or more performance values 44 from system memory 10 and compare the one or more performance values 44 to respective performance threshold values 45 (e.g., compare power usage to threshold power usage, compare bandwidth usage to threshold bandwidth usage, and so forth). If PE circuit 28 determines that a certain number of performance values are greater than their respective performance threshold values 45, then PE circuit 28 may instruct (e.g., based on information that PE circuit 28 outputs or via control signals) FG circuit 26 to increase the amount of foveation to apply.

As described above, in some examples, PID circuit 24 intercepts the output from GPU driver 32 indicating the amount of foveation that is to be applied. FG circuit 26 may increase the amount of foveation that is to be applied from the amount determined by application 22. GPU driver 32 may then output the updated foveation gain value (e.g., the information indicating the amount of foveation to apply) to system memory 10. For instance, as described above, GPU driver 32 may store a command stream in memory 10. In addition, GPU driver 32 may store foveation gain (e.g., amount of foveation to apply) in memory 10. As illustrated, GPU driver 32 may store the commands to render and the foveation gain as render commands/foveation gain 46 in memory 10.

GPU driver 32 and/or operating system 34 may define the performance threshold values and store them as performance threshold values 45 in memory 10. GPU driver 32 and/or operation system 34 may be preprogramed with information indicating the maximum level of each performance metric or factor. GPU driver 32 and/or operating system 34 may set the respective performance threshold values to be equal to or less than the maximum level of each performance metric or factor, and store the performance threshold values as performance threshold values 45 in memory 10.

In some cases, it may be possible for performance values 44, as determined by GPU 12, to fluctuate over a short period of time. This fluctuation could cause performance values 44 to oscillate greater than and less than performance threshold values 45. Because performance values 44 being less than or greater than performance threshold values 45 determines foveation gain, the oscillation of performance values 44 being less than and then greater than performance threshold values 45 may continuously change the foveation gain. Such constant increase and decrease in foveation gain can negatively impact user experience.

In some examples, PE circuit 28 may determine a running average of the performance values 44 (or some other type of averaging) to minimize the continuously increasing and decreasing foveation gain. In such examples, PE circuit 28 may compare the averaged performance values 44 over a period of time to respective performance threshold values 45 to determine whether to cause FG gate circuit 26 to increase the amount of foveation that is applied.

In the above examples, PE circuit 28 is described as comparing respective performance values 44 with respective performance threshold values 45. Accordingly, PE circuit 28 may compare one of performance values 44 to one of performance threshold values 45. In some examples, PE circuit 28 may combine one or more of performance values 45 into a composite performance value. In such examples, PE circuit 28 may compare the composite performance value to a composite performance threshold value. The composite performance threshold value may be another example of performance threshold values 45 and may be stored instead of or in addition to the other performance threshold values 45 and/or GPU driver 32 or operating system 34 may determine the composite performance threshold value during operation from performance threshold values 45.

Although performance measurement circuit 42 may determine a plurality of performance values 44, each of performance values 44 may not equally contribute to the determination of whether to increase foveation gain. For example, temperature may be more important in controlling foveation gain as compared to bandwidth usage. PE circuit 28 may be configured to weigh the performance values differently and combine the weighted values together to determine a composite weighted performance value. For example, PE circuit 28 may multiply the performance value from the temperature by a first ratio (e.g., 0.9) and multiply the performance value the bandwidth usage by a second ratio (e.g., 0.1). PE circuit 28 may add the two weighted performance values together and divide the value by two. In this example, the performance value from the temperature contributes much more to the composite weighted performance value than the bandwidth usage. Weighting temperature and bandwidth, the ratios used, and the manner in which the weighting is performed are all provided as examples and should not be considered limiting.

In such examples, PE circuit 28 may compare the composite weighted performance value to a composite threshold weighted performance value. The composite threshold weighted performance value may be another example of performance threshold values 45 and may be stored instead of or in addition to the other performance threshold values 45 and/or GPU driver 32 or operating system 34 may determine the composite threshold weighted performance value during operation from performance threshold values 45.

In the above examples, PID circuit 24 is described as adjusting the amount of foveation to apply as defined by application 22. For cases where application 22 does not define the amount of foveation to apply, PE circuit 28 may still compare performance values 44 to performance threshold values 45 (actual, composite, or weighted composite values). FG circuit 26 may determine an amount of foveation to apply based on the comparison. For example, FG circuit 26 may define that the center of the image should have no foveation and define portions outwards from the center where foveation should be applied.

To avoid confusion, GPU performance value is a generic term used to refer to actual performance values 44, average of performance values 44, composite of performance values 44, or composite weighted performance values 44. GPU performance threshold value is a generic term used to refer to actual performance threshold values 45, average of performance threshold values 45, composite of performance threshold values 45, or composite weighted performance threshold values 45.

In the above examples, performance measurement circuit 42, PE circuit 28, and FG circuit 26 form a feedback circuit. In adjusting or setting the foveation gain, FG circuit 26 may increase the foveation gain by a set amount each time, and repeat increasing the amount of foveation being applied until the GPU performance value is less than or equal to the GPU performance threshold value. As another example, FG circuit 26 may increase the foveation gain drastically, and then slowly lower the foveation gain until the GPU performance value is approximately equal to the GPU performance threshold value.

In some examples, local memory of CPU 6 may store a look up table that provides some approximations of what the foveation gain should be for various differences between the GPU performance value and the GPU performance threshold value. FG circuit 26 may determine the amount of foveation gain to apply based on the look up table.

Once FG circuit 26 determines the amount of foveation GPU 12 is to apply, GPU driver 32 may store the information as render commands/foveation gain 46. GPU driver 32 may cause GPU 12 to render an image based on the determined amount of foveation to apply. Controller 36 may retrieve the foveation gain information from render commands/foveation gain 46 and cause GPU 12 to apply the appropriate level of foveation. The result is a rendered image frame that GPU 12 stores in frame buffer 48.

There may be various ways in which GPU 12 performs foveation. As one example, the foveation gain information may indicate how much foveation to apply and to which portions of an image frame the foveation is to be applied. As one example, each vertex information may include the foveation gain. Controller 36 may determine which projection matrix a vertex shader executing on shader core 38 should multiply to the vertex coordinate data based on the foveation gain information. The projection matrix will define how much area the primitive formed by the vertex will encompass, and may set the resolution (e.g., number of pixels) within the primitive to be smaller than for other primitives on which a higher amount of resolution (e.g., less foveation) is needed. When GPU 12 renders the primitive, the number of pixels in the primitive may be less than for other areas. Because the number of pixels in the primitive is less than for other areas, controller 36 may execute fewer instantiations of a fragment shader as compared to other areas.

As another example for foveation, controller 36 may cause shader core 38 and fixed-function units 40 to generate the entire image at the same "lower" resolution. Controller 36 may then cause shader core 38 and fixed-function units 40 to upsample with high quality filtering certain portions of the image frame. Other examples include variable rate shading (VRS).

It should be understood that the above provides various non-limiting examples. In general, performance measurement circuit 42 may determine performance values in addition to or instead of the ones described above. PE circuit 28 may determine the GPU performance value and perform comparison between GPU performance value and GPU performance threshold value using any of the techniques above or other techniques as well. FG circuit 26 may increase or possibly decrease the amount of foveation that is to be applied using one or any combination of the above techniques or other techniques as well. Controller 36 may cause GPU 12 to perform foveation using any of the example techniques described above.

Accordingly, PE circuit 28 may receive information indicative of a performance of GPU 12. FG circuit 26 may determine an amount of foveation to apply based on the received information. For instance, PE circuit 28 may determine a GPU performance value based on one or more of power consumption, bandwidth usage, GPU core usage, and temperature and compare the GPU performance value to a GPU performance threshold value. FG circuit 26 may determine the amount of foveation that GPU 12 is to apply to an image frame based on the comparison. As an example, PE circuit 28 may determine that the GPU performance value is greater than the GPU performance threshold value. FG circuit 26 may repeatedly increase an amount of foveation being applied by GPU 12 until the GPU performance value is less than or equal to the GPU performance threshold value.

In this way, FG circuit 26 and PE circuit 28 may continuously determine whether to increase the foveation. For instance, FG circuit 26 and PE circuit 28 may determine whether to increase the foveation during the rendering of an image by GPU 12.

In some examples, PE circuit 28 may determine a weighted composite performance value. For instance, PE circuit 28 may receive a first value indicative of the performance of GPU 12 (e.g., temperature) and a second value indicative of the performance of GPU 12 (e.g., bandwidth usage). PE circuit 28 may weigh the first value by a first weighting factor to generate a first weighted factor (e.g., multiply first value with a first ratio), and weigh the second value by a second, different weighting factor to generate a second weighted factor (e.g., multiply second value with a second ratio). FG circuit 26 may determine the amount of foveation to apply based at least in part on the first weighted factor and the second weighted factor. For example, PE circuit 28 may use the first and second weighted factors to determine the GPU performance value (e.g., average of the first and second weighted factors) and based on a comparison of the GPU performance value and the GPU performance threshold value, FG circuit 26 may determine the amount of foveation to apply.

For instance, PE circuit 28 may output to FG circuit 26 information indicating whether the GPU performance value is greater than the GPU performance threshold value, and FG circuit 26 may in response determine the amount of foveation that GPU 12 is to apply. As another example, PE circuit 28 may output to FG circuit 26 information indicating the difference between the GPU performance value and the GPU performance threshold value, and FG circuit 26 may in response determine the amount of foveation that GPU 12 is to apply (e.g., via a look up table mapping difference in GPU performance value and GPU performance threshold value and amount of foveation that is to be applied).

GPU driver 32 may cause GPU 12 to render an image based on the determined amount of foveation to apply. For example, GPU driver 32 may store the information indicative of the amount of foveation to apply in memory 10. Because the amount of foveation to apply is being determined continuously, in some examples, GPU driver 32 may update the amount of foveation that GPU 12 is to apply during the rendering of the image.

Figure 3:
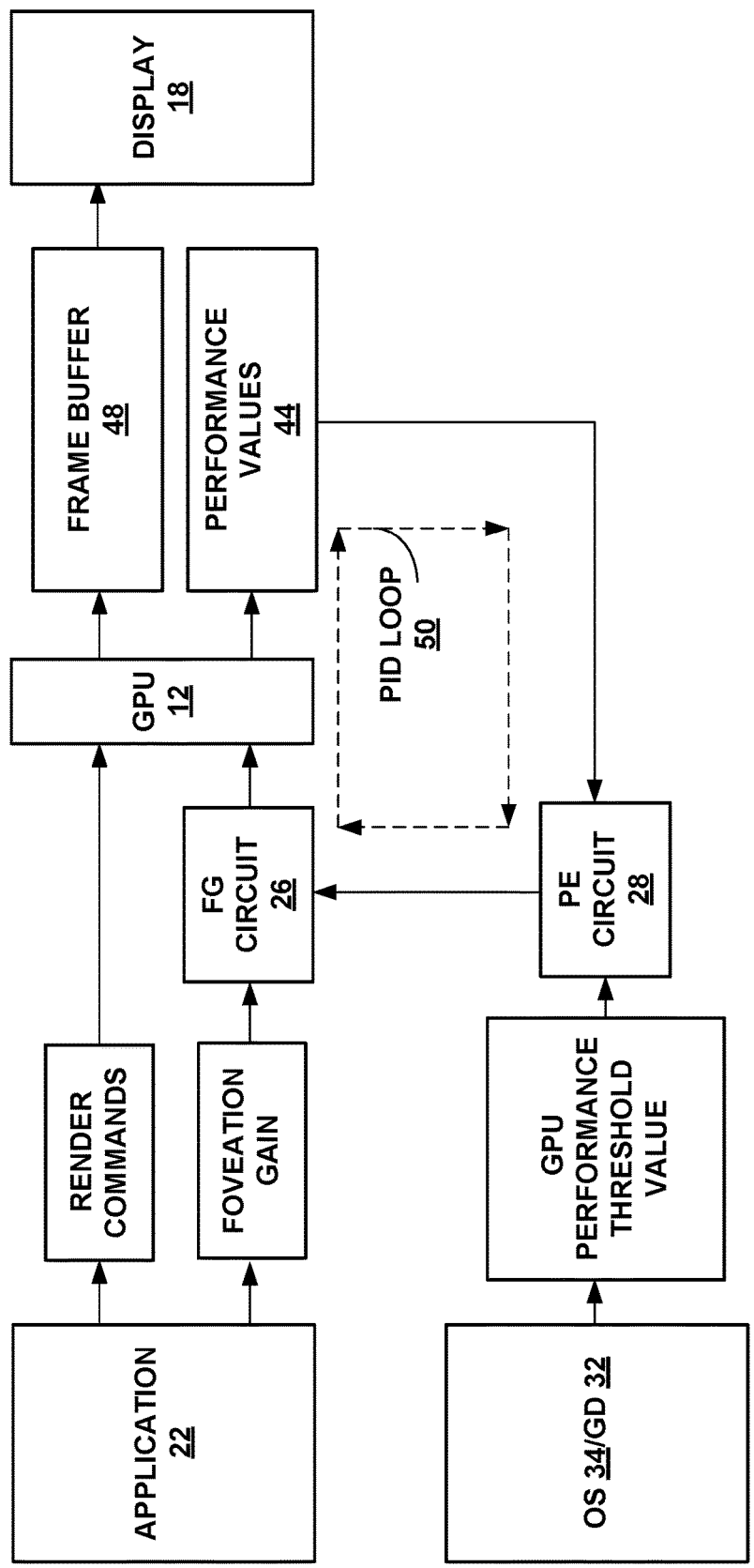
FIG. 3 is a conceptual diagram illustrating an example process flow in accordance with one or more example techniques described in this disclosure.

FIG. 3 is a conceptual diagram illustrating an example process flow in accordance with one or more example techniques described in this disclosure. Application 22 executes on CPU 6 and generates render commands and foveation gain (e.g., the amount of foveation that GPU 12 is to apply). GPU driver 32 stores the render commands in memory 10 as part of render commands/foveation gain 46. However, GPU driver (GD) 32 and/or operating system (OS) 34 does not immediately store the foveation gain to memory 10. Rather, FG circuit 26 receives the foveation gain value and adjusts the foveation gain. GPU driver 32 stores the resulting adjusted or updated foveation gain value as part of render commands/foveation gain 46 in memory 10.

While GPU 12 is rendering the image frame, performance measurement circuit 42 of GPU 12 generates a plurality of performance values 44 that performance measurement circuit 42 stores in memory 10. PE circuit 28 receives information indicative of the performance of GPU 12 (e.g., receives performance values 44). PE circuit 28 may determine the GPU performance value based on performance values 44 and compare the GPU performance value with the GPU performance threshold value. FG circuit 26 may determine the amount of foveation to apply based on the comparison.

For example, PE circuit 28 may determine that the GPU performance value is greater than the GPU performance threshold value. FG circuit 26 may repeatedly increase an amount of foveation being applied until the GPU performance value is less than or equal to the GPU performance threshold value based on the foveation gain and the output of PE circuit 28 (e.g., output of PE circuit 28 may be information indicating difference in performance value and performance threshold value, a control signal indicating that FG circuit 26 is to increase or decrease foveation gain, etc.). FG circuit 26 may determine the amount of foveation to be applied by GPU 12 by updating the amount of foveation that GPU 12 is to apply during the rendering of the image. As noted above, GPU 12 may apply foveation by rendering at a reduced resolution and upsampling certain portions or changing the size of the primitive to be rendered based on projection matrices.

In the illustrated example, FG circuit 26 may receive information indicating an amount of foveation that is to be applied. For instance, application 22 may have determined the amount of foveation that is to be applied. FG circuit 26 may determine the amount of foveation to apply by adjusting the amount of foveation that is to be applied. In examples where application 22 does not provide the amount of foveation that is to be applied, FG circuit 26 may still determine the amount of foveation to apply. For example, in this example, application 22 may be considered as determining that the amount of foveation to apply is zero, and FG circuit 26 may determine a non-zero value as the amount of foveation to apply.

In this way, FG circuit 26, performance measurement circuit 42, and PE circuit 28 form a proportional-integral-derivative (PID) loop 50. PID loop 50 is a feedback loop to continuously or periodically (e.g., once a frame or once every N frames) determine whether changes in the amount of foveation is needed. By changing the amount of foveation to be applied, GPU 12 may be able to render the graphics content at a fast enough rate to achieve the desired frame rate with minimal negative impact on user experience. For instance, the portions being foveated are not portions the user should be viewing and so high fidelity is not a necessity in those portions, but too much blurriness could impact user experience. By dynamically controlling the amount of foveation that is applied, issues with displaying VR content with thermal throttling may be reduced.

GPU driver 32 may cause GPU 12 to render the image based on the determined amount of foveation to apply. The result is a rendered image that GPU 12 stores in frame buffer 48. Display 18 may display the content stored in frame buffer 48.

Figure 4:
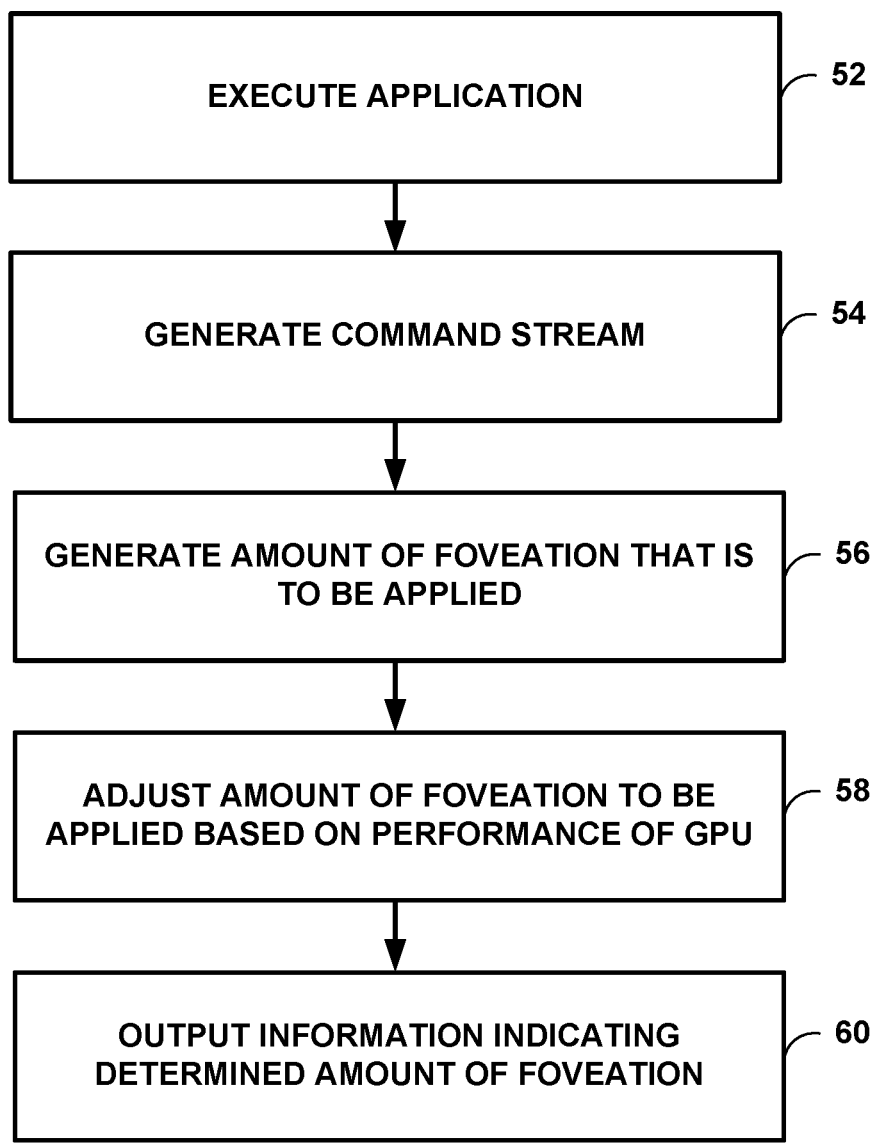
FIG. 4 is a flowchart illustrating an example method of processing data.

FIG. 4 is a flowchart illustrating an example method of processing data. This example may be applicable for rendering an image for a virtual reality (VR) application. However, the techniques are not limited to rendering images for VR applications and are applicable generally to graphics processing.

As illustrated, application 22 executes on CPU 6 (52), e.g., for generating VR content. The result of the execution is that application 22 generates a command stream (54) and generates information indicating an amount of foveation that is to be applied (56).

In the techniques described in this disclosure, FG circuit 26 may adjust the amount of foveation to be applied based on performance of GPU 12 (58). For example, PE circuit 28 may receive one or more performance values 44 as determined by performance measurement circuit 42. Performance values 44 may be indicative of a performance of GPU 12. Examples of performance values 44 include temperature, power consumption, bandwidth usage, GPU core utilization, and selection and graphics API usage.

FG circuit 26 may determine an amount of foveation to apply based on the received information. For example, PE circuit 28 may determine a GPU performance value based on performance values 44. In determining the GPU performance value, PE circuit 28 may apply different weighting to different ones of performance values 44 (e.g., weigh a first value indicative of the performance of GPU 12 by a first weighting factor to generate a first weighted factor and weight a second value indicative of the performance of GPU 12 by a second, different weighting factor to generate a second weighted factor). FG circuit 26 may determine the amount of foveation to apply based at least in part on the first weighted factor and the second weighted factor.

For example, PE circuit 28 may determine a composite performance value based on the different weighting of the performance values (e.g., weighted average based on the different weighting) and compare the composite performance value to a threshold value. If the composite performance value is greater than the threshold value, PE circuit 28 outputs information indicating the difference or a control signal (e.g., information that indicates that the foveation gain is to be adjusted) to FG circuit 26, and FG circuit 26 determines the foveation to apply. In this way, FG circuit 26 determines the amount of foveation to apply based at least in part on the first weighted factor and the second weighted factor.

FG circuit 26 may repeatedly increase the amount of foveation being applied until the GPU performance value is less than or equal to the GPU performance threshold value. Accordingly, FG circuit 26 may determine the amount of foveation to apply during the rendering of the image so that GPU can apply the updated amount of foveation during the rendering of the image.

FG circuit 26 may output information of the determined amount of foveation to apply for GPU 12 to render an image based on the determined amount of foveation to apply (60). FG circuit 26 may output information of the determined amount of foveation to graphics driver 32, and graphics driver 32 may cause GPU 12 to render the image based on amount of foveation. For instance, graphics driver 32 may output information indicating where controller 36 is to retrieve render commands/foveation gain 46 from memory 10. GPU 12 may then render the image based on render commands/foveation gain 46, where FG circuit 26 adjusts the foveation gain from the value received from application 22. Graphics driver 32 may cause GPU 12 to update the amount of foveation to be applied during rendering of the image because PE circuit 28 may be continuously monitoring performance of GPU 12 and when needed cause FG circuit 26 to adjust the foveation gain even during the rendering of the image frame.

GPU 12 may utilize various techniques such as selective multiplication of vertex information with different projection matrices or rendering an image at a low resolution and upsampling those portions were foveation gain is minimal. GPU 12 may apply foveation at certain portions as defined by application 22 or in the center of the image frame, if application 22 does not define the portions. By adjusting the amount of foveation GPU 12 is to apply, the example techniques may control the amount of power expended by GPU 12 and possibly control the temperature of GPU 12 with minimal effect on viewer experience. By keeping the power and temperature of GPU 12 (as well as other parameters such as bandwidth and the like) less than a maximum operation point, the example techniques may allow GPU 12 to generate VR content without excessive dropping of frames or other changes that impacts viewer experience.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry such as discrete hardware that performs processing.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware, firmware, and/or software components, or integrated within common or separate hardware or software components.

The techniques described in this disclosure may also be stored, embodied or encoded in a computer-readable medium, such as a computer-readable storage medium that stores instructions. Instructions embedded or encoded in a computer-readable medium may cause one or more processors to perform the techniques described herein, e.g., when the instructions are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable storage media that is tangible.

Various aspects and examples have been described. However, modifications can be made to the structure or techniques of this disclosure without departing from the scope of the following claims.

What is claimed is:

1. A method of processing data, the method comprising:
receiving information indicative of a performance of a graphics processing unit (GPU), wherein the information includes a first value indicative of the performance of the GPU and a second value indicative of the performance of the GPU, wherein the first value is indicative of one of the power consumption, the bandwidth usage, the GPU core utilization, or the graphics API usage, and the second value is indicative of another one of the power consumption, the bandwidth usage, the GPU core utilization, or the graphics API usage;
determining a GPU performance based on at least one of the first value and the second value;
comparing the GPU performance to a GPU performance threshold;
determining an amount of foveation to apply based on the comparison; and
outputting information of the determined amount of foveation to apply for the GPU to render an image based on the determined amount of foveation to apply.

2. The method of claim 1, further comprising:
receiving information indicating an amount of foveation that is to be applied,
wherein determining the amount of foveation to apply comprises adjusting the amount of foveation that is to be applied.

3. The method of claim 1, wherein determining the amount of foveation to apply based on the comparison comprises repeatedly increasing an amount of foveation being applied until the GPU performance value is less than or equal to the GPU performance threshold value.

4. The method of claim 1,
further comprising:
weighting the first value by a first weighting factor to generate a first weighted factor; and
weighting the second value by a second, different weighting factor to generate a second weighted factor,
wherein determining the GPU performance comprises determining the GPU performance based at least in part on the first weighted factor and the second weighted factor.

5. The method of claim 1, wherein determining the amount of foveation to apply based on the received information comprises determining the amount of foveation to apply during the rendering of the image,
the method further comprising:
causing the GPU to render the image based on the determined amount of foveation to apply by updating the amount of foveation to apply during the rendering of the image.

6. The method of claim 1, wherein the image is for a virtual reality (VR) application.

7. A device for processing data, the device comprising:
a graphics processing unit (GPU);
a performance estimation circuit configured to receive information indicative of a performance of the GPU, wherein the information includes a first value indicative of the performance of the GPU and a second value indicative of the performance of the GPU, wherein the first value is indicative of one of the power consumption, the bandwidth usage, the GPU core utilization, or the graphics API usage, and wherein the second value is indicative of another one of the power consumption, the bandwidth usage, the GPU core utilization, or the graphics API usage, and wherein the performance estimation circuit is configured to:
determine a GPU performance based on at least one of the first value and the second value; and
compare the GPU performance to a GPU performance threshold; and
a foveation gate circuit configured to:
determine an amount of foveation to apply based on the comparison; and
output information of the determined amount of foveation to apply for the GPU to render an image based on the determined amount of foveation to apply.

8. The device of claim 7, wherein the foveation gate circuit is configured to receive information indicating an amount of foveation that is to be applied, and wherein to determine the amount of foveation to apply, the foveation circuit is configured to adjust the amount of foveation that is to be applied.

9. The device of claim 7, wherein to determine the amount of foveation to apply based on the comparison, the foveation gate circuit is configured to repeatedly increase an amount of foveation being applied until the GPU performance value is less than or equal to the GPU performance threshold value.

10. The device of claim 7,
wherein the performance estimation circuit is configured to:
weight the first value by a first weighting factor to generate a first weighted factor, and
weight the second value by a second, different weighting factor to generate a second weighted factor,
wherein to determine the GPU performance, the foveation gate circuit is configured to determine the GPU performance based at least in part on the first weighted factor and the second weighted factor.

11. The device of claim 7, wherein to determine the amount of foveation to apply based on the received information, the foveation gate circuit is configured to determine the amount of foveation to apply during the rendering of the image.

12. The device of claim 7, wherein the image is for a virtual reality (VR) application.

13. A device for processing data, the device comprising:
means for receiving information indicative of a performance of a graphics processing unit (GPU), wherein the information includes a first value indicative of the performance of the GPU and a second value indicative of the performance of the GPU, wherein the first value is indicative of one of the power consumption, the bandwidth usage, the GPU core utilization, or the graphics API usage, and wherein the second value is indicative of another one of the power consumption, the bandwidth usage, the GPU core utilization, or the graphics API usage;
means for determining a GPU performance based on at least one of the first value and the second value;
means for comparing the GPU performance to a GPU performance threshold;
means for determining an amount of foveation to apply based on the comparison; and
means for outputting information of the determined amount of foveation to apply for the GPU to render an image based on the determined amount of foveation to apply.

14. The device of claim 13, further comprising:
means for receiving information indicating an amount of foveation that is to be applied,
wherein the means for determining the amount of foveation to apply comprises means for adjusting the amount of foveation that is to be applied.

15. The device of claim 13, wherein the means for determining the amount of foveation to apply based on the comparison comprises means for repeatedly increasing an amount of foveation being applied until the GPU performance value is less than or equal to the GPU performance threshold value.

16. A non-transitory computer-readable storage medium comprising instructions that when executed cause one or more processors of a device for processing data to:
receive information indicative of a performance of a graphics processing unit (GPU), wherein the information includes a first value indicative of the performance of the GPU and a second value indicative of the performance of the GPU, wherein the first value is indicative of one of the power consumption, the bandwidth usage, the GPU core utilization, or the graphics API usage, and the second value is indicative of another one of the power consumption, the bandwidth usage, the GPU core utilization, or the graphics API usage;
determine a GPU performance based on at least one of the first value and the second value;
compare the GPU performance to a GPU performance threshold;
determine an amount of foveation to apply based on the comparison; and
output information of the determined amount of foveation to apply to the GPU for the GPU to render an image based on the determined amount of foveation to apply.

17. The non-transitory computer-readable storage medium of claim 16, further comprising instructions that cause the one or more processors to:
receive information indicating an amount of foveation that is to be applied,
wherein the instructions that cause the one or more processors to determine the amount of foveation to apply comprise instructions that cause the one or more processors to adjust the amount of foveation that is to be applied.

18. The non-transitory computer-readable storage medium of claim 16, wherein instructions that cause the one or more processors to determine the amount of foveation to apply based on the comparison comprise instructions that cause the one or more processors to repeatedly increase an amount of foveation being applied until the GPU performance value is less than or equal to the GPU performance threshold value.

19. The method of claim 5, wherein the image is rendered by the GPU with a first portion at a first resolution and a second portion at a second resolution, wherein the second resolution is lower than the first resolution, and the first portion and the second portion are determined by the amount of foveation to apply.

* * * * *